United States Patent

[11] 3,619,165

[72] Inventors Rupert A. Covey
Wolcott;
Charles E. Crittendon, Hamden, both of Conn.

[21] Appl. No. 676,728
[22] Filed Oct. 20, 1967
[45] Patented Nov. 9, 1971
[73] Assignee Uniroyal, Inc.
New York, N.Y.

[54] ALKYNL CARBOXYLATES AND THEIR USE FOR KILLING MERISTEMATIC BUDS
13 Claims, No Drawings

[52] U.S. Cl. ........................................................ 71/70,
71/76, 71/78, 71/106, 260/486

[51] Int. Cl. ........................................................ A01n 9/00,
A01n

[50] Field of Search ........................................... 71/106, 78;
424/314; 260/486

[56] References Cited

UNITED STATES PATENTS 2,931,754 4/1960 Baldridge ..................... 71/106
3,340,040 9/1967 Tso.............................. 71/78

*Primary Examiner*—James O. Thomas, Jr.
*Attorney*—Patrick F. Bright

ABSTRACT: The invention concerns a composition containing an alkynyl carboxylate and its use for killing meristematic tissue on ornamental and agricultural plants.

ALKYNL CARBOXYLATES AND THEIR USE FOR KILLING MERISTEMATIC BUDS

This invention relates to alkynyl esters of higher fatty acids and their use for killing meristematic buds.

The manual removal of the stem apex, including a few apical leaves and flowers if present, to stimulate the development of axillary buds into lateral branches is an established process for the grower of ornamental plants. This process is known as pruning or pinching and requires hand labor. In order to reduce this expensive and time consuming labor it is obviously desirable to develop chemical means.

While it has been observed that the lower alkyl esters of the higher fatty acids exhibit chemical pruning activity they have suffered from several disadvantages. In accordance with this invention it has been discovered that alkynyl esters of the higher fatty acids have outstanding chemical activity with regard to killing meristematic buds and, additionally, have the following advantages over the lower alkyl esters of the higher fatty acids of the prior art:

1. Optimum concentrations can be sprayed to runoff without being phytotoxic to the mature stem tissue, and mature leaves.
2. Active at much lower concentrations.
3. Easier to formulate.

The compounds of this invention may be used for killing meristematic buds on ornamental and agricultural herbaceous, semiwoody and woody plants such as chrysanthemum, cotton, azalea, apple and tobacco. Meristematic buds include both terminal and axillary buds. The selective killing of terminal buds is an application for which the chemicals of the invention are particularly useful.

The compounds of the invention have the formula

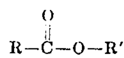

where R is a higher alkyl, alkenyl, cycloalkyl or halo-substituted derivative thereof having from five to 16 carbon atoms, and R'is alkynyl or haloalkynyl having from three to nine carbon atoms.

These compounds may be prepared from the corresponding acids (RCOOH) and alcohols (R'OH) by esterification under acidic conditions or from the acid chloride RCOCl and alcohol in the presence of an HCl acceptor.

Examples of acids (RCOOH) suitable for preparation of compounds of this invention include hexanoic, heptanoic, 2-ethylhexanoic, octanoic, nonanoic, decanoic, cyclohexylbutyric, undecanoic, undecenoic, dodecanoic, tridecanoic, tetradecanoic, hexadecanoic, cyclohexylacetic, neodecanoic, 2-chlorohexanoic, 2-bromodecanoic, 10,11-dichloronndecanoic, cyclohexanecarboxylic, 3,5-dimethyloctanoic and 6,6-diethylnonanoic.

Examples of R'include propargyl, 1-(2-butynyl), 1-(3-butynyl, 2-(3-butynyl, 2-(2-methyl- 3-butynyl), 1-(3-hexynyl), 1-ethynylcyclohexyl and 1-(4-chloro-2-butynyl).

The chemicals of the present invention may be applied to plants, which term includes various plant parts such as seeds, flowers, fruits, vegetables, roots and foliage in various manners. Seeds may be treated directly with the chemical before planting, or seeds may be treated with the chemical by incorporating the chemical in the soil before or after planting the seeds. The chemicals may be applied to plants in an inert medium as a dust in admixture with a powdered solid carrier, such as the various mineral silicates, e.g., mica, talc, pyrophyllite and clays or as an aqueous composition. The chemicals may be applied in admixture with small amounts of surface-active wetting agents, which may be anionic, nonionic, or cationic surface-active agents, generally as aqueous compositions. The chemicals may be dissolved in organic solvents such as acetone, benzene, or kerosene, and the solutions of the chemicals emulsified in water with the aid of surface-active agents. Such surface-active agents are well known and reference is made to U.S. Pat. No. 2,547,724, columns 3 and 4 for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form.

The concentration of active chemical in the useful formulations may vary widely, e.g., from 1 percent to 95 percent. Generally, the active chemical in dispersions which are applied are from 0.05 percent to 6.0 percent. The amount per acre of active chemical applied may vary from 0.5 pounds to 50 pounds depending on the plant being treated and other factors known to those skilled in the art.

Compounds of this invention may be prepared by the usual methods of esterification. Two examples are shown below.

EXAMPLE A–PREPARATION OF PROPARGYL DECANOATE

A solution of 5.6 g. (0.1 mole) propargyl alcohol and 8.1 ml. (7.9 g. 0.1 mole) pyridine in 10 ml. benzene was added dropwise during 10 minutes to a solution of 19.0 g. (0.1 mole) decanoyl chloride in 25 ml. benzene keeping the temperature of the reaction mixture between 15° and 20°. The mixture was stirred for 0.5 hour and was washed with water and then with sodium bicarbonate solution. The benzene was removed under reduced pressure and the product distilled, b.p. 95°–98° (1.3 mm.) giving 17.1 g. (81 percent) of colorless oil.

EXAMPLE B–PREPARATION OF PROPARGYL UNDECANOATE

Undecanoic acid (55.8 g., 0.3 mole) 50.4 g. (0.9 mole) propargyl alcohol and a catalytic amount of p-toluene sulfonic acid were combined in 100 ml. benzene. The solution was refluxed for 18 hours, collecting 19.2 ml. of azeotrope in a Dean-Stank trap. The reaction mixture was washed with dilute sodium hydroxide solution and then twice with water (until the washings were neutral to pH paper). The solvent was removed under reduced pressure and the product distilled, b.p. 157°–164° (12 mm.) yield 621 g. (92.4 percent).

EXAMPLE C

Compounds prepared by the above procedures are shown in the following table along with boiling points and carbon-hydrogen analyses.

| Chemical | B.P. ° C. (mm.) | Calculated | | Found | |
|---|---|---|---|---|---|
| | | C | H | C | H |
| Propargyl hexanoate | 79–84 (7) | 70.10 | 9.15 | 70.51 | 9.50 |
| Propargyl heptanoate | 111–115 (22) | 71.40 | 9.59 | 71.82 | 10.08 |
| Propargyl octanoate | 108–112 (7) | 72.50 | 9.95 | 72.28 | 9.88 |
| Propargyl nonanoate | 78–83 (1.2) | 73.45 | 10.28 | 74.32 | 10.59 |
| Propargyl decanoate | 95–98 (1.3) | 74.25 | 10.55 | 74.37 | 10.29 |
| Propargyl undecanoate | 157–164 (12) | 74.94 | 10.78 | 74.69 | 10.95 |
| Propargyl dodecanoate | 113–120 (1.4) | 75.58 | 11.00 | 75.40 | 11.24 |
| Propargyl 2-ethylhexanoate | 58–61 (0.8) | 72.50 | 9.95 | 71.91 | 9.86 |
| Propargyl 4-cyclohexylbutyrate | 100–102 (1.1) | 74.95 | 9.68 | 75.18 | 9.53 |
| Propargyl undecenoate | 86–92 (0.45) | 75.60 | 9.97 | 75.34 | 10.16 |
| 1-(2-butynyl)decanoate | 97–101 (0.5) | 74.94 | 10.78 | 75.33 | 10.57 |
| 1-(4-chloro-2-butynyl)-decanoate | 146–153 (1.8) | 64.96 | 8.95 | 65.07 | 9.25 |

The plants are prepared for chemical treatment by the following procedure:

Rooted cuttings of *Chrysanthemum morifolium* cv. Improved Indianapolis Yellow are planted in 12 oz. styrofoam pots in a sterilized soil mixture of one part soil, one part peat moss, and one part horticultural perlite. At planting and weekly thereafter, the plants are fertilized with 25–5–30 analysis fertilizer at the rate of one ounce per three gallons of water. For 7 to 10 days following planting, the plants are placed under a polyethylene "tent" and frequently syringed to provide conditions of both high temperature and high relative humidity, respectively. The potted plants are maintained under long-day conditions by the use of supplemental fluorescent light form 5 P.M. to 9 P.M and from 5 A.M. to 7 A.M. daily. Ten days to 2 weeks after planting the established plants are ready to treat.

The compounds of the invention were formulated according to one of the following techniques:

ACETONE FORMULATION

One hundred ml. of a 25,000 p.p.m. spray solution are prepared by dissolving 2.5 grams of the selected compound in 20 ml. of acetone and two drops (60 mg.) of isooctyl phenyl polyethoxy ethanol (Triton X100) surface active wetting agent. Dilutions to 10,000, 4,000 and 2,000 p.p.m. are prepared by diluting the appropriate amount of the 25,000 p.p.m. solution with water to which isooctyl phenyl polyethoxy ethanol has been added at the rate of two drops per 100 ml.

EMULSIFIABLE CONCENTRATE FORMULATION

Two and one-half grams of the selected compound and 0.23 g. of isooctyl phenyl polyethoxy ethanol are combined to produce an emulsifiable concentrate, 90 percent of which is the active ingredient. Enough water is added to the 2.83 g. of emulsifiable concentrate to bring the total volume to 100 ml. This result in a 25,000 p.p.m. solutions. Dilutions to 10,000 4,000 and 2,000 p.p.m. are prepared by diluting the appropriate amount of the 25,000 p.p.m. solution with water to which isooctyl phenyl polyethoxy ethanol has been added at the rate of two drops per 100 ml.

The aqueous formulations are applied as a foliar spray until the plants are wet to runoff. The plants are allowed to dry and then placed in the greenhouse at a temperature of 65° F. minimum night temperature.

Within 12 to 24 hours following the application of optimum dosages and formulations of said compounds, the shoot apex, embryonic leaves and embryonic axillary meristems (hereinafter collectively referred to as the terminal meristem) turn black and are very flaccid. Within the next few days this same dead tissue turns grayish and a constriction appears on the stem at the proximal limit of the killed tissue. At optimum concentrations the compounds are nonphytotoxic to matured axillary meristems, leaves, and stem tissue. This process of killing the terminal meristem with aqueous emulsion of the compounds of the mentioned type will hereinafter be referred to as chemical pruning.

At concentrations less than optimum the terminal meristem is not completely killed and therefore maintains apical dominance over the axillary meristems. At concentrations in excess of optimum both the terminal and axillary meristems may be killed without causing damage to foliage and stem tissue.

With other compounds concentrations in excess of optimum may kill the terminal meristem and be phytotoxic to mature leaves but may not kill the axillary meristem. Concentrations in excess of optimum of still other compounds may kill the terminal an axillary meristems and be phytotoxic to the mature leaves.

The following table shows the minimum concentration of the compounds required to achieve chemical pruning activity.

| Compound | Minimum Concentration (p.p.m.) Producing Chemical Pruning Activity* 20% Acetone Formulation | 90% E.C. Formulation |
|---|---|---|
| Propargyl hexanoate | ** | 25,000 |
| Propargyl heptanoate | | 15,000 |
| Propargyl octanoate | 20,000 | 8,000 |
| Propargyl nonanoate | 20,000 | 6,000 |
| Propargyl decanoate | 8,000 | 6,000 |
| Propargyl 2-bromodecanoate | | 3,000 |
| Propargyl undecanoate | 9,000 | 6,000 |
| Propargyl dodecanoate | ** | 12,000 |
| Propargyl undecanoate | 9,000 | 6,000 |
| 1-(2-butynyl) decanoate | | 15,000 |
| 1-(4-chloro- 2-butynyl)decanoate | | 9,000 |
| Propargyl cyclohexanebutyrate | | 8,000 |

* *Chrysanthemum morifolium* cv. Improved Indianapolis Yellow.
** Inactive at 25,000 p.p.m.

The most closely related chemical compound known to the art for killing meristermatic buds, methyl decanoate, was formulated by blending equal weights of the compound with the surfactant polyoxyethylene sorbitan monolaurate. Sufficient water was added during the blending to form a gel. By adding additional water and blending further, a colloidal emulsion was formed which was used to treat the plants as previously described. This formulation is the optimum and recommended by the manufacturer. A minimum concentration of 20,000 p.p.m. was required for activity. this is considerably inferior to the results obtained with most compounds of the instant invention. Note particularly the preferred activity of the carboxylate derived from the seven to eleven carbon acids.

Having thus described our invention, what we claim and desire to protect by Letters Patent is:

1. A method of killing meristematic buds on ornamental and agricultural herbaceous, semiwoody and woody plants which composes treating said buds with a compound of the formula:

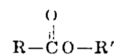

where R is alkyl, alkenyl, cycloalkyl or halo-substituted derivative thereof having five to 12 carbon atoms and R' is an alkynyl or haloalkynyl group having three to five carbon atoms, said compound being applied in an amount sufficient to kill said buds.

2. The method of claim 1 wherein R' is propargyl.

3. The method of claim 1 wherein R is an alkyl group.

4. The method of claim 1 wherein R is an alkyl group having from seven to 11 carbon atoms.

5. The method of claim 1 wherein R is an octyl group.

6. The method of claim 1 wherein R is a nonyl group.

7. The method of claim 1 wherein R is a decyl group.

8. The method of claim 1 wherein R is a halo alkyl group.

9. the method of claim 1 wherein R is a bromo substituted nonyl group.

10. The method of claim 1 wherein R is an alkenyl group.

11. A composition for killing meristematic buds on ornamental and agricultura herbaceous, semiwoody and woody plants which comprises a compound having the formula

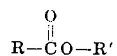

where R is an alkyl, alkenyl, cycloalkyl or halo-substituted derivative thereof having five to 12 carbon atoms and R' is an alkynyl or haloalkynyl group having three to five carbon atoms and a surface active agent.

12. A method for killing meristematic buds on ornamental and agricultural herbaceous, semi-woody and woody plants which comprises treating said buds with propargyl decanoate in an amount sufficient to kill said buds.

13. A composition for killing meristematic buds on ornamental and agricultural herbaceous, semiwoody and woody plants which comprises propargyl decanoate and a surface active agent.

PO-1050
(5/69)

UNITED STATES PATENT OFFICE
CERTIFICATE OF CORRECTION

Patent No. 3,619,165 Dated November 9, 1971

Inventor(s) RUPERT A. COVEY et al.

It is certified that error appears in the above-identified patent and that said Letters Patent are hereby corrected as shown below:

In claim 1, column 4, line 30, "composes" should read --comprises--.

In claim 11, column 4, line 50, "agricultura" should read --agricultural--; claim 11, line 58, between "atoms" and "and", insert a comma.

Signed and sealed this 30th day of May 1972.

(SEAL)
Attest:

EDWARD M.FLETCHER, JR.
Attesting Officer

ROBERT GOTTSCHALK
Commissioner of Patents